United States Patent [19]

Lane, III et al.

[11] Patent Number: 5,133,215
[45] Date of Patent: Jul. 28, 1992

[54] PRESSURE TRANSMITTER ASSEMBLY HAVING SENSOR ISOLATION MOUNTING

[75] Inventors: Charles E. Lane, III, Meadowbrook; Douglas W. Wilda, Ambler, both of Pa.

[73] Assignee: Honeywell Inc., Minneapolis, Minn.

[21] Appl. No.: 717,583

[22] Filed: Jun. 19, 1991

[51] Int. Cl.$^5$ .............................. C01L 7/08; C01L 9/06
[52] U.S. Cl. .............................. 73/756; 73/706; 73/708; 73/721; 73/727; 338/4
[58] Field of Search .......... 73/706, 708, 702, 716–728, 73/754, 756, DIG. 4; 338/4; 361/283; 29/621.1

[56] References Cited

U.S. PATENT DOCUMENTS 4,683,757  8/1987  Adams et al. ..................... 73/720
5,062,302 11/1991  Petersen et al. .................. 73/721

Primary Examiner—Donald O. Woodiel
Attorney, Agent, or Firm—A. A. Sapelli; D. Lenkszus; W. Udseth

[57] ABSTRACT

The apparatus for sensing pressure comprises a header, having at least one input port for receiving a substance under pressure. A substrate, having a wafer-like shape with a relatively large surface area in comparision to its thickness, includes at least one internal passage to couple the substance under pressure. A pressure sensing element is mounted onto the surface of the substrate over an exit port of the internal passage coupling the substance under pressure. The substrate is bonded to a surface of the header at extreme locations from a location in which the pressure sensing element is mounted. Thus isolation is provided for the pressure sensing element from unwanted stresses induced in the substrate.

8 Claims, 4 Drawing Sheets

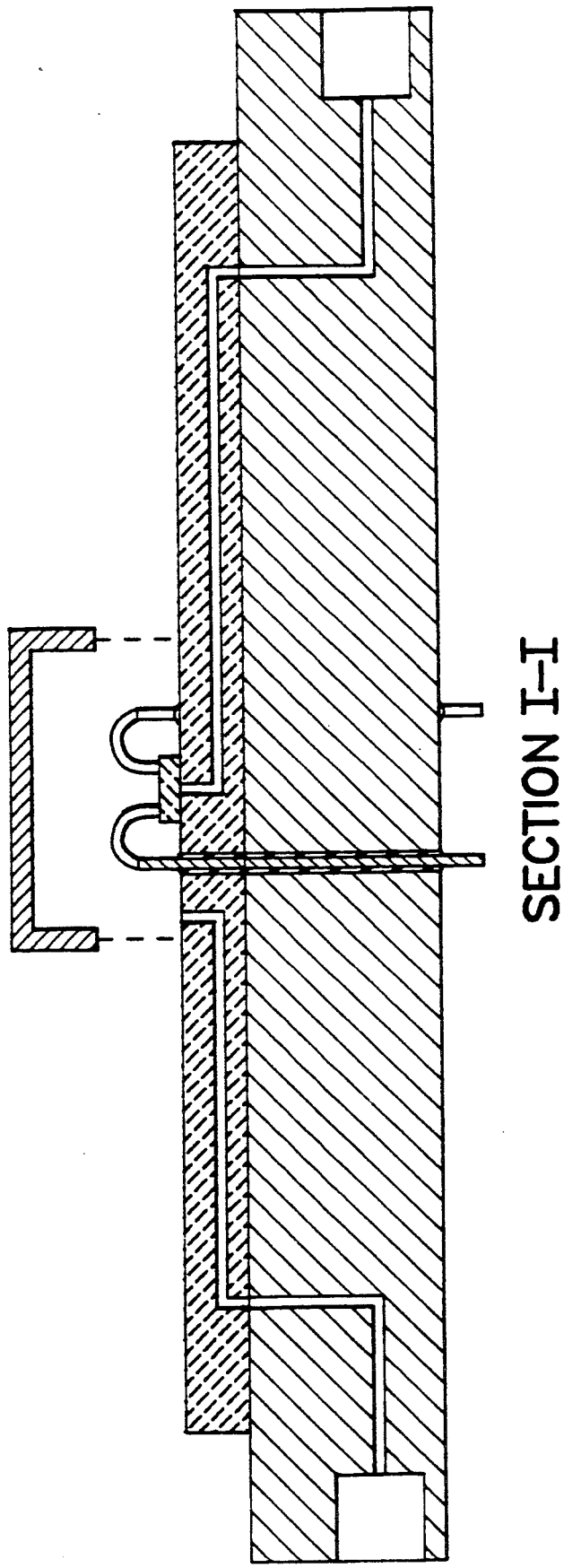
SECTION I-I
Fig. 1.C

PRESSURE TRANSMITTER ASSEMBLY HAVING SENSOR ISOLATION MOUNTING

BACKGROUND OF THE INVENTION

The present invention relates to a pressure transmitter assembly, and more particularly, to a pressure transmitter assembly configuration for mounting a pressure sensor element of the pressure transmitter assembly to provide a more effective isolation of the pressure sensor element from outside sources of error, including temperature, stress . . . .

In current systems a silicon pressure sensor element is mounted onto a PYREX tube to provide stress isolation between the silicon pressure sensor element and a metal (or plastic) structure. This configuration accommodates mismatches in the thermal coefficient of expansion (TCE) between the materials. By mounting the pressure sensor element onto a PYREX tube (which is approximately a ½ inch long tube), stresses induced by the dissimilar materials are equalized before the stress effects the silicon pressure sensor element (sometimes referred to herein as a silicon die). This arrangement minimizes any errors in measuring the pressure due to the effects of changes in temperature on the mounting joint. The resulting configuration of these present systems result in a long cylindrical column relative to the silicon die, resulting in a structure that is subject to vibration and shock damage (due to the length to diameter ratios).

Thus there is provided by the present invention a mounting arrangement for the pressure sensor element which provides isolation from the vibration and stress without requiring a long bulky assembly. The present invention provides a low profile structure by turning the mounting structure such that it is essentially in the same plane as the surface of the silicon die, thereby resulting in the very low profile. Essentially all of the components are constrained into one plane, and allows for thermal isolation, and stress isolation to take place between the pressure port and the pressure sensor element. The pressure sensor element of the present invention is mounted on a ceramic structure having interlayer passages which form the pressure port and is coupled to the bottom side of the chip (i.e., silicon die). The ceramic mounting material provides the same function served by the PYREX tube in the previous systems; however, keeping the ceramic in the same plane as the silicon die surface reduces the vibration and shock damage tendency while still allowing flexure between the metal header and the sensor element. The resulting design of the present invention includes the pressure sensor element constrained in the same plane as the circuit leaving a flat structure which is much easier to handle both electrically and mechanically. In the present invention the ceramic mounting surface of the silicon die does not need to be TCE matched as closely to the silicon as in the previous configuration. Thus, many more common ceramics (and low cost ceramics) can be utilized because of the flexibility inherent in the structure which provides the stress isolation.

SUMMARY OF THE INVENTION

Thus there is provided by the present invention, a pressure transmitter assembly having a configuration for mounting a pressure sensor element to provide a more effective isolation of the pressure sensor element. The apparatus of the present invention for sensing pressure comprises a header, having at least one input port for receiving a substance under pressure. A substrate, having a wafer-like shape with a relatively large surface area in comparison to its thickness, includes at least one internal passage to couple the substance under pressure. A pressure sensing element is mounted onto the surface of the substrate over an exit port of the internal passage coupling the substance under pressure. The substrate is bonded to a surface of the header at predetermined locations of the substrate, the predetermined locations being at extreme locations from a location in which the pressure sensing element is mounted. Thus isolation is provided for the pressure sensing element from unwanted stresses induced in the substrate. The inputs of the internal passages of the substrate is lined-up to receive the substance under pressure from the input ports of the header.

Accordingly, it is an object of the present invention to provide a pressure transmitter assembly having a configuration for mounting a pressure sensor element having a more effective isolation of the pressure sensor element.

This and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 1C shows a cross sectional view of the pressure transmitter assembly of the present invention of FIG. 1;

FIGS. 2A and 2B, shows a comparison of the configuration of the present invention to the configuration of systems, FIG. 2B showing the prior art configuration.

DETAILED DESCRIPTION

Figure 1:
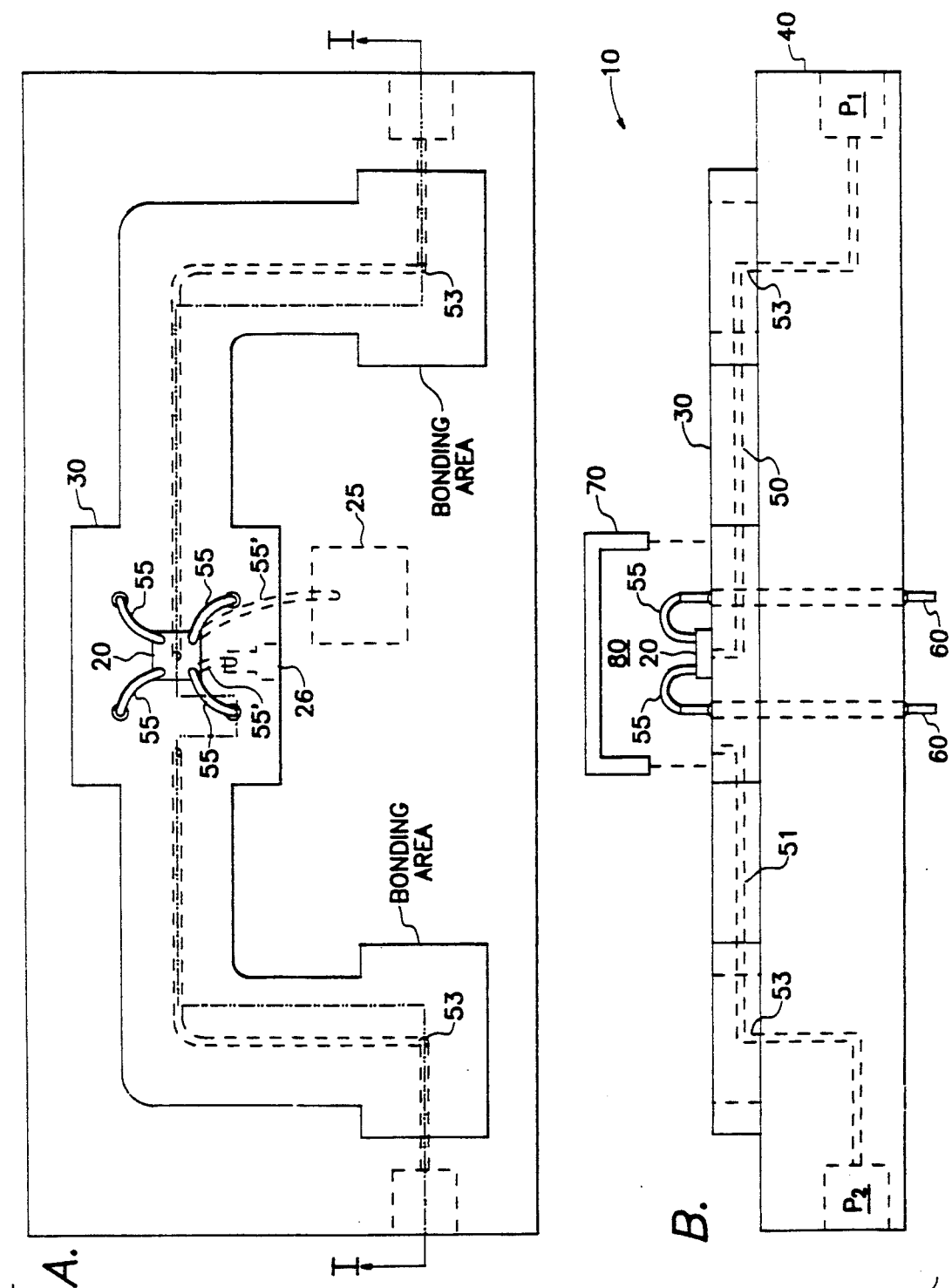
FIG. 1 which comprise FIGS. 1A and B, shows a top and front view of a pressure transmitter assembly of the present invention having a configuration which provides a more effective isolation of a sensor element.

Referring to FIG. 1, which comprises FIGS. 1A through 1C, there is shown a top and front view of a pressure transmitter assembly 10 of the preferred embodiment of the present invention. A pressure sensor element 20 (i.e., a silicon die which acts as a diaphragm, having a piezo -electric or -dielectric (including - resistive) or resonant properties well known in the art utilized to detect variations in pressure) is mounted on a substrate 30. The substrate 30 consists of a material which has a essentially the same thermal coefficient of expansion (TCE) as the silicon material of the pressure sensor element 20. The pressure sensor element 20 is mounted onto the substrate 30 utilizing bonding techniques well known to those skilled in the art, including gold-silicon, utectic bonding, adhesive bonding, or soldering.

The substrate 30 is arranged in a form to create areas of flexure to accommodate the differences in thermal expansion between the substrate 30 and the mounting 40, the mounting being metal (or plastic) and sometimes referred to as a header. The bonding of the substrate 30 to the mounting 40 is only in an area of the substrate 30 which is at an extreme location (i.e., as far removed as possible) from the location where the silicon die is mounted. In the preferred embodiment the bonding is at the location of the input ports 53 of the substrate 30.

The silicon die 20 of the preferred embodiment essentially has a wafer-like shape having a large surface area and is relatively thin. Likewise, the substrate 30 has a large surface area and is relatively thin. In the preferred embodiment of the present invention, the large surface area of the silicon die 20 is bonded to the relatively large surface area of the substrate 30. Further the large surface are of the silicon die 20 of the preferred embodiment of the present invention is essentially square, and the surface area of the substrate 30 has a configuration resembling the letter -U, or more precisely, a block letter -U. Thus the configuration of the preferred embodiment of the present invention has the components necessary to mount the pressure sensor element 20 constrained into one (1) plane, the plane being parallel to the surface area of the silicon die 20, thereby yielding a low profile assembly.

Figure 2:
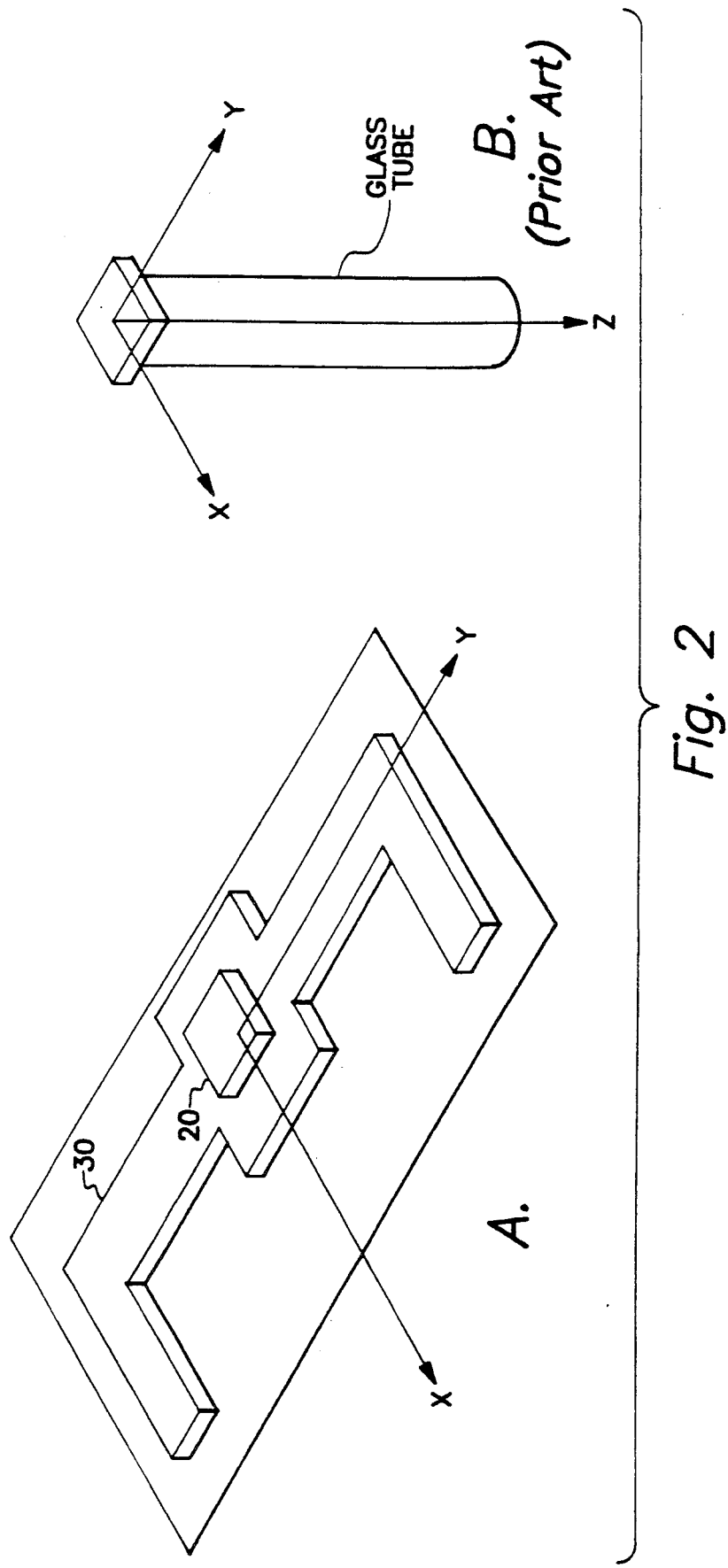
FIG. 2 comprises

Referring to FIG. 2, there is shown a comparison between the configuration of the present invention over the configuration of the prior art utilizing a glass tube to achieve sensor isolation. The preferred embodiment of the present invention is constrained to the X-Y plane and results in a low profile assembly. The isolation achieved by the length of the glass tube of the prior art is effectively realized in the present invention by the configuration of the substrate 30 (i.e., in the "arms of the letter -U") but the substrate 30 is rotated to be in the same plane as the pressure sensor element 20 (i.e., X-Y plane).

Referring back to FIG. 1, internal passages 50 are provided in the substrate 30 for coupling pressure inputs to the pressure sensor element 20. A pressure input port P1 in the mounting 40 is configured to line up with the internal passage 50 of the substrate 30. The internal passage 50 exits from the portion of the substrate 30 which is covered by the pressure sensor element 20. Additional internal passages 51 can be included in the substrate 30 and are coupled to a second pressure port P2. Variations in electrical quantities of the pressure sensor element can be coupled to pins 60 to electrical circuitry (not shown), or can be coupled directly to electric circuitry 25 bonded to the mounting 40 via connections 55' and then subsequently outputted via pins 60 to additional electronic circuitry and microprocessor for processing the sensed electrical quantities. Alternatively, the sensor element 20 can be wired 55' to a conductive track 26 on the substrate 30 which carries the signal under the cover 70, the track (s) 26 then having connections made thereto to external circuitry (not shown). The pressure transmitter assembly 10 can be a differential pressure transmitter assembly by including a cap 70 and using the pressure input port P2 is the input for a second pressure input. In such a case the internal passage 51 must exit inside an enclosed area 80 such that the pressure P2 is subjected to the opposite side of the pressure sensor element 20 as compared to the pressure inputted from internal passage 50 via port P1.

The top view of FIG. 1 does not include the cap 70. It will be recognized by those skilled in the art that the internal passages of the substrate 30 can be achieved by the utilization of the substrate 30 formed of multiple layers. It will be further recognized that the drawings are not necessarily to scale but are intended to show the features provided.

Figure 3:
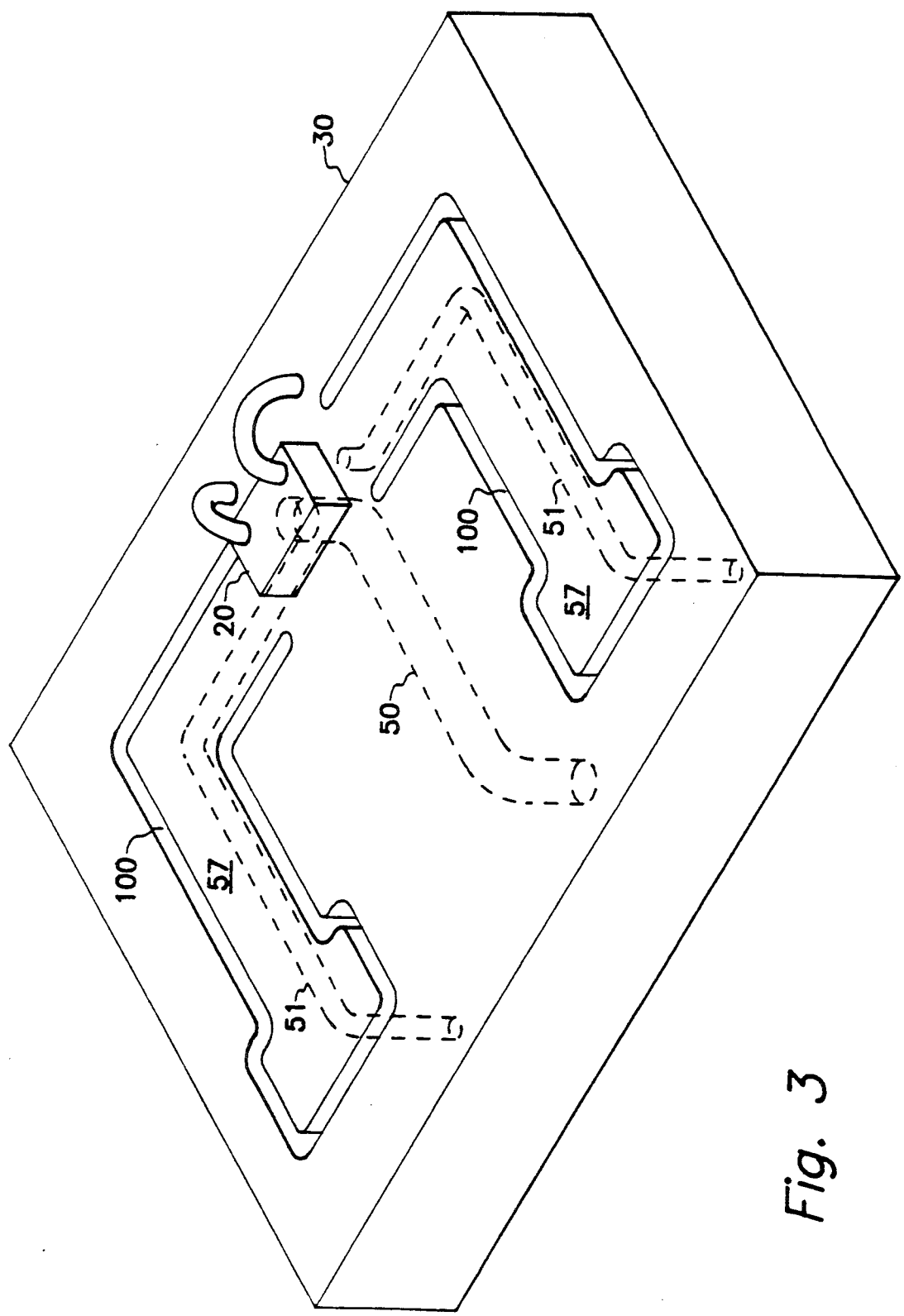
FIG. 3 shows an isometric view of an alternative embodiment of a pressure transmitter assembly having an alternative configuration for providing a more effective isolation of the pressure sensor element.

Referring to FIG. 3, there is shown an alternative configuration of the present invention. The substrate 30 of this configuration includes (or can include) circuit elements mounted on the substrate 30. The pressure sensor element 20 is mounted directly onto the substrate 30, and the substrate 30 mounted onto the mounting (not shown). Cutouts 100 of the substrate 30 have a shape similar to the shape of the substrate 30 of the embodiment discussed above, and form a peninsula-like portion 57 of the substrate. The internal passages 50, 51 for coupling pressure inputs to the pressure sensor element are again internal to the substrate 30 and can reside anywhere within the substrate, i.e., the arms within the cutouts, 51 or the solid portion 50 of the substrate 30. The substrate 30 is bonded to the mounting (not shown) under the extremities of the arms of the cutouts only, leaving the remainder of the substrate to essentially float on the mounting (not shown), thereby isolating the pressure sensor element 20 from any stresses induced as a result of temperature, unwanted pressure, .

The substrate 30 of the preferred embodiment of the present invention is a ceramic material, which is not necessarily TCE matched as closely to the TCE of the silicon as in previous configurations. Because of the isolation achieved by the structure of the present invention, many common ceramics (low cost ceramics) may be utilized and achieves a high degree of stress isolation. It will be recognized by those skilled in the art that the configuration of the substrate 30 is not limited to the (letter U) shape as shown in the preferred embodiment, but additional configurations may be utilized which effectively have the length of the glass tube of the prior art in the same plane as the plane of the pressure sensor. The porting (internal passages) of the substrate 30 for coupling the pressure to be measured, may be coupled to the bottom of the mounting element in addition to exiting from the side of the mounting element as shown in FIG. 1.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:
1. An apparatus for sensing pressure, comprising:
   a) Header means, having at least one input port for containing a substance under pressure;
   b) substrate means, having a wafer-like shape with a relatively large surface area in comparison to its thickness, the substrate means further including at least one internal passage to couple the substance under pressure; and
   c) means for sensing pressure mounted onto the surface of said substrate means over an exit port of said internal passage coupling the substance under pressure, the substrate means being bonded to a surface of said header means at predetermined locations of said substrate means, said predetermined locations being at extreme locations from a location in which said means for sensing pressure is mounted, thereby providing isolation for said means for sensing pressure from unwanted stresses induced in said substrate means, the input of the internal passage of the substrate means lining up to receive the substance under pressure from at least one input port of the header means.

2. An apparatus for sensing pressure, according to claim 1, wherein the relatively large surface area of said substrate means has an area in the shape of a block letter U.

3. An apparatus for sensing pressure, according to claim 1, wherein external stresses induced in said substrate means are in a single plane of said substrate means, the single plane being parallel to the large surface area of the substrate means, the external stresses being absorbed by a flexure of the substrate means in the single plane thereby isolating the means for sensing pressure from the external stresses.

4. An apparatus for sensing pressure, according to claim 2, wherein external stresses induced in said substrate means are in a single plane of said substrate means, the single plane being parallel to the large surface area of the substrate means, the external stress being absorbed by a flexure of the substrate means in the single plane thereby isolating the means for sensing pressure from the external stress.

5. An apparatus for sensing pressure, according to claim 4, wherein a first internal passage of said substrate means exit to a first side of said means for sensing pressure, and a second internal passage exit into a space of the apparatus contiguous to a second side of said means for sensing pressure.

6. An apparatus for sensing pressure according to claim 5, further comprising:
a cap mounted on said substrate means forming an enclosed area, and wherein said second internal passage exits in the enclosed area such that any pressure in said enclosed area is impressed on the second side of said means for sensing pressure thereby resulting in an apparatus which senses pressure differential between the pressure within first and second internal passage.

7. An apparatus for sensing pressure, according to claim 6 wherein said substrate means is made of a ceramic material.

8. An apparatus for sensing pressure, comprising:
a) header means, having at least one input port for containing a substance under pressure;
b) substrate means, having a wafer-like shape with a relatively large surface area in comparison to its thickness, the substrate means further including at least one internal passage to couple the substance under pressure; and
c) means for sensing pressure mounted onto the surface of said substrate means over an exit port of said internal passage coupling the substance under pressure, the substrate means having at least one cut-out, the cut-out forming a peninsula-like portion of said substrate means, and wherein at least one internal passage is included in the peninsula-like portion of the substrate means, the input to the internal passage of the substrate means lining up with the input port of the header means, and further wherein the input to the internal passage being at an extremity of the peninsula-like portion of the substrate means, the means for sensing pressure being mounted on a portion of the substrate means away from the peninsula-like portion of the substrate means, the substrate means being bonded to the header means in an area around the input port of the header means at the extremity of the peninsula-like portion of the substrate means.

* * * * *